C. M. CROOK.
ELECTRICAL MEASURING INSTRUMENT.
APPLICATION FILED NOV. 27, 1908.

1,073,098.

Patented Sept. 16, 1913.

Witnesses
George C. Higham.
Frank J. Thelen

Inventor
Charles M. Crook
By Brown + Williams
Attorneys

C. M. CROOK.
ELECTRICAL MEASURING INSTRUMENT.
APPLICATION FILED NOV. 27, 1908.

1,073,098.

Patented Sept. 16, 1913.
4 SHEETS—SHEET 4.

Witnesses
George E. Higham
Frank J. Phelan

Inventor
Charles M. Crook
By Brown & Williams
Attorneys

UNITED STATES PATENT OFFICE.

CHARLES M. CROOK, OF CHICAGO, ILLINOIS, ASSIGNOR TO THE WILLIS ELECTRIC METER CO., OF CHICAGO, ILLINOIS, A CORPORATION OF ILLINOIS.

ELECTRICAL MEASURING INSTRUMENT.

1,073,098.  Specification of Letters Patent.   Patented Sept. 16, 1913.

Application filed November 27, 1908.   Serial No. 464,545.

*To all whom it may concern.*

Be it known that I, CHARLES M. CROOK, a citizen of the United States, residing at Chicago, in the county of Cook and State of Illinois, have invented a certain new and useful Improvement in Electrical Measuring Instruments, of which the following is a full, clear, concise, and exact description, reference being had to the accompanying drawings, forming a part of this specification.

My invention relates to electrical measuring instruments, particularly to wattmeters, and contemplates more mechanical and economical construction and arrangement of the various parts.

In meters of the prior art the mechanical construction and arrangement is faulty. More or less complicated and unnecessary mechanism is used for supporting the meter parts, the result being a large and bulky meter. The various parts in these prior instruments are supported and connected together usually by threaded members which very readily jar loose, thus disturbing the assembly and adjustment. Separate pivot members are usually provided for the armature and for the integrating mechanism driven by the armature, which members readily lose their relative adjustment. In general, the construction and arrangement of meters of the prior art are such that the supporting parts must be very heavy and complicated in order that the meter operative parts will maintain their adjustment, and in order that the meter can be shipped without resulting in loosening and derangement of the parts.

The construction and arrangement of my invention are such that a minimum number of parts are so constructed and applied that meter adjustments will remain constant, and such that the meter can be readily shipped without danger of the parts becoming loosened and deranged.

Other features of my invention cover simplified adjusting means for the controlling parts, particularly the adjusting means for the brush mechanism.

A meter which embodies the features of my invention is shown in the accompanying drawings, in which—

The meter supporting frame F has the rectangular base 1, from which extend the walls 2, 3, 4 and 5, which inclose the main parts of the meter, and from the lower end of which also extend the walls 6, 7 and 8, which with the wall 5, form the terminal compartment 9. The walls 2, 3, 4 and 5 are engaged by the cover 10, preferably of glass, while the compartment 9 is closed by a lid or cover 11, which lid is riveted at one corner 12, so that it may be swung open and shut, and which at its opposite corner is adapted to be locked in the closed position by screw 13 passing through the lid into engagement with the lug 14. On the lid is a lug 15 surrounding the screw 13 and having a pocket 16 for receiving the screw head, there being a hole 17 through the upper part of the lug 15 through which a sealing wire or pin can be passed to engage over the head of the locking screw, and thus seal said screw in its locked position. Extending from the top of this base 1 is a supporting lug 18 having the opening 19 and the slot 20 leading therefrom. When the meter is to be supported in place the head of the supporting screw passes through the opening 19 and upon lowering of the meter then engages in the slot 20. Through the lower part of the base within the compartment 9 are two or more screw holes 21 through which screws may be applied after the slot 20 engages under the head of the top supporting screw, and the meter will then be securely held to its support. After the lid 11 is applied and sealed the meter cannot be removed from its support without disturbing the seal. This has a tendency to prevent unscrewing of the meter from its support and tampering with the parts thereof.

Extending from the base, near the top thereof, are a plurality of supporting bosses 22, four of these being shown. These lugs are elongated and extend toward each other and at their inner ends form seats for the field coil 23, which is arranged parallel to the base 1. The field coil is held against vertical displacement by pins or posts 24, extending from the upper and lower seat lugs 22, and the coil is held against lateral displacement by posts 25 extending from the side seat lugs. The coil is held against the seat lugs by the annular plate 26, of non-magnetic material, and having the slot 26' for breaking up eddy or other disturbing currents this plate having ears 27 engaging the threaded extensions 28 from the ends of the side posts 25, washers 29 and thumb nuts 30 engaging the threaded ends, whereby the plate can be securely locked to the ends of the side posts and against the coil to lock the coil to the seats, lateral movement of the coil being prevented by the posts 24 and 25. The seat lugs are cast integral with the base and the posts are driven into openings which extend through the lugs and may be riveted at the other side of the base, the end of the posts which is driven into the lugs being of slightly reduced diameter. This driving fit of the posts insures their permanent position and consequently the field coil will always assume the same position with reference to the other meter parts. If the posts were threaded into the lugs, they would be apt to become loosened by the jarring of the meter, particularly during shipment, and the field coil would become displaced. To remove the field coil it is only necessary to undo the thumb nuts 30, whereupon the plate 26 can be removed and the field coil slid from the lug seats and from the retaining posts; and when the coil is again applied, it will assume its former position without readjustment of any kind.

At the top of the frame end extending from the base are two lugs 31, 32, supporting the arms 33 and 34 respectively. These arms have reduced ends which are driven through openings in the lug and which may be riveted at their ends at the back of the base. Clamped to the lugs 31 and 32 by the shoulders 35 of the arms is the brush mechanism supporting frame 36, which will be described more in detail later. The arms 33, 34 are conveniently rectangular, their front ends being cut down to leave shoulders 37 and shelf parts 38. Supported from the ends of the arms and secured to the shelf parts 38, is the supporting and pivot plate 39, whose shape is best shown in the top view shown in Fig. 3. This plate has slots 40, 41, extending forwardly from the rear edge thereof, these slots being adapted to engage under the heads of screws 42 which thread into the shelf parts 38 of the arms 33 and 34. Between the ends of the arms and the screws 42, pins 43 are driven tightly into openings in said arms, these pins being received by the openings 44 cut in the plate 39 in front of the slots 40 and 41. The rear end of the plate 39 at its sides abuts against the shoulders 37, while the inner part 45 of its edge extends a distance rearwardly between the arms and abuts at its ends against said arms. The supporting lugs 31, 32, being cast integral with the base, the arms 37 being driven and riveted in said lugs, and the plate 39 being held so securely to said arms, said plate is absolutely rigid and will maintain this rigidity without danger of becoming loosened during shipment. The plate, however, can readily be removed for inspection or repair by merely withdrawing the screws 42, but said plate will assume its true position when again applied. This plate also supports or forms a bearing for an armature spindle 46, this spindle being vertical and supporting a spherical armature structure 47. The spindle passes diametrically across the field coil and directly in front of the plate 26, the armature extending through the plate into the field coil.

Figure 2:
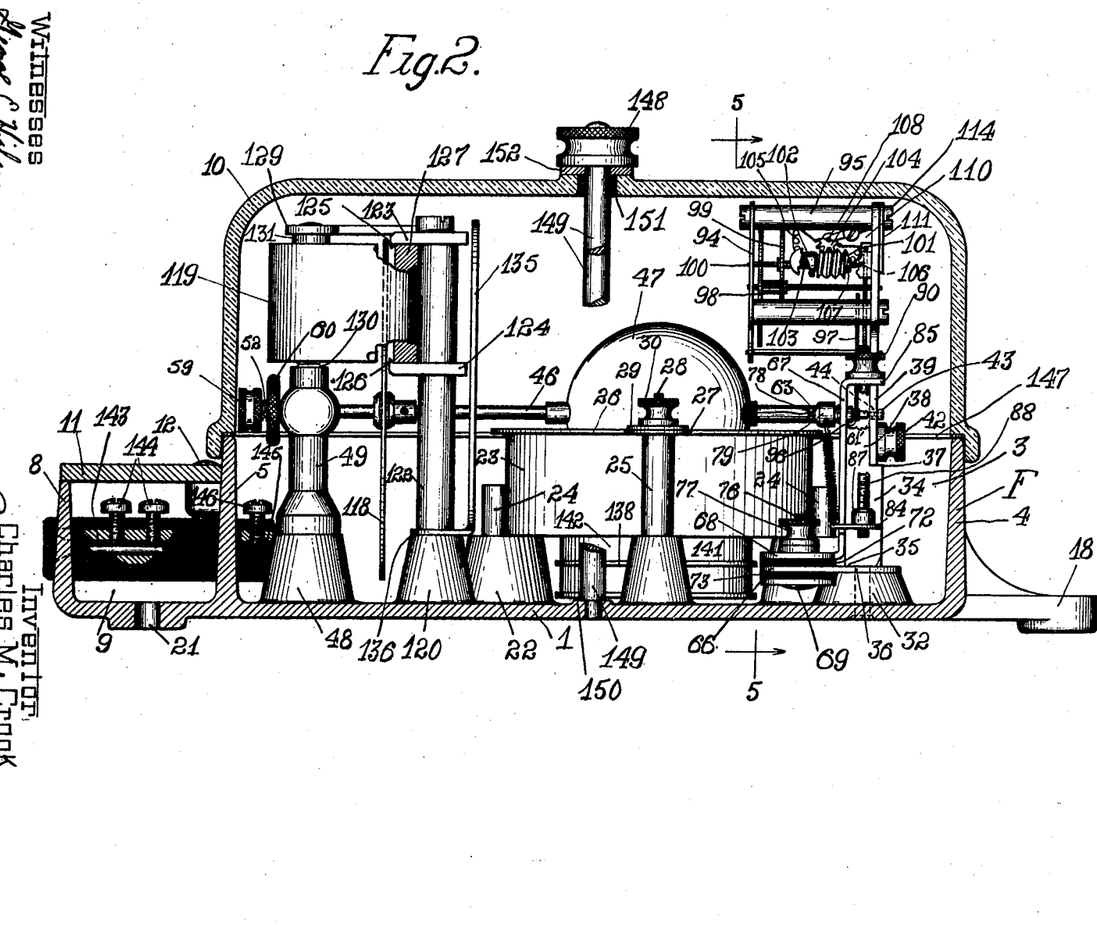
Fig. 2 is a sectional view taken on plane 2—2 of Fig. 1.
Figure 6:
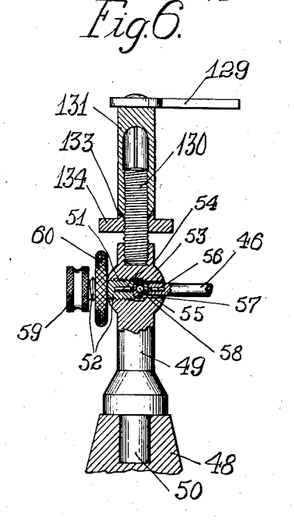
Fig. 6 is a sectional view of the common supporting member for the lower armature bearing and for the damping magnet adjusting member.

At the lower part of the frame is the lug 48, also cast integral with the base plate, this lug supporting the post 49, best shown in Figs. 2 and 6. The reduced end 50 of this post is driven snugly into the lug 48, the post thus being rigid. Extending upwardly into the end of said post 49 is a threaded pocket 51 for receiving the screw 52 which supports the lower bearing 53. This bearing 53 is concave and secured in place by its leg or extension 54 which engages in the end of the screw 52. In the lower end of the armature spindle 46 a small bearing 55 is provided, held in place by means of its leg 56 extending into the lower end of the spindle, the lower end of the spindle extending into the pocket 57 which communicates with the pocket 51, a steel ball 58 being interposed between the concave bearings. The diameter of the pockets is such that the ball is confined to the concave bearings and therefore no matter how the meter is jarred or jolted, the ball will always roll to its proper pivot position when the meter is secured to its support. By means of the knurled head 59 the screw 52 may be adjusted in the threaded pocket to adjust the ball bearings. A jam nut 60 serves to lock the screw 52 in any adjusted position. The ball bearing supports the entire weight of the spindle and parts mounted thereon, the upper part of the spindle having the bearing pin 61 extending through the pivot opening 62 in the plate 39.

At the upper end of the armature spindle is carried the commutator 63, whose segments are connected with the armature. This commutator is engaged by brush terminals 64 and 65 whose supporting mechanism will now be described.

Figure 1:
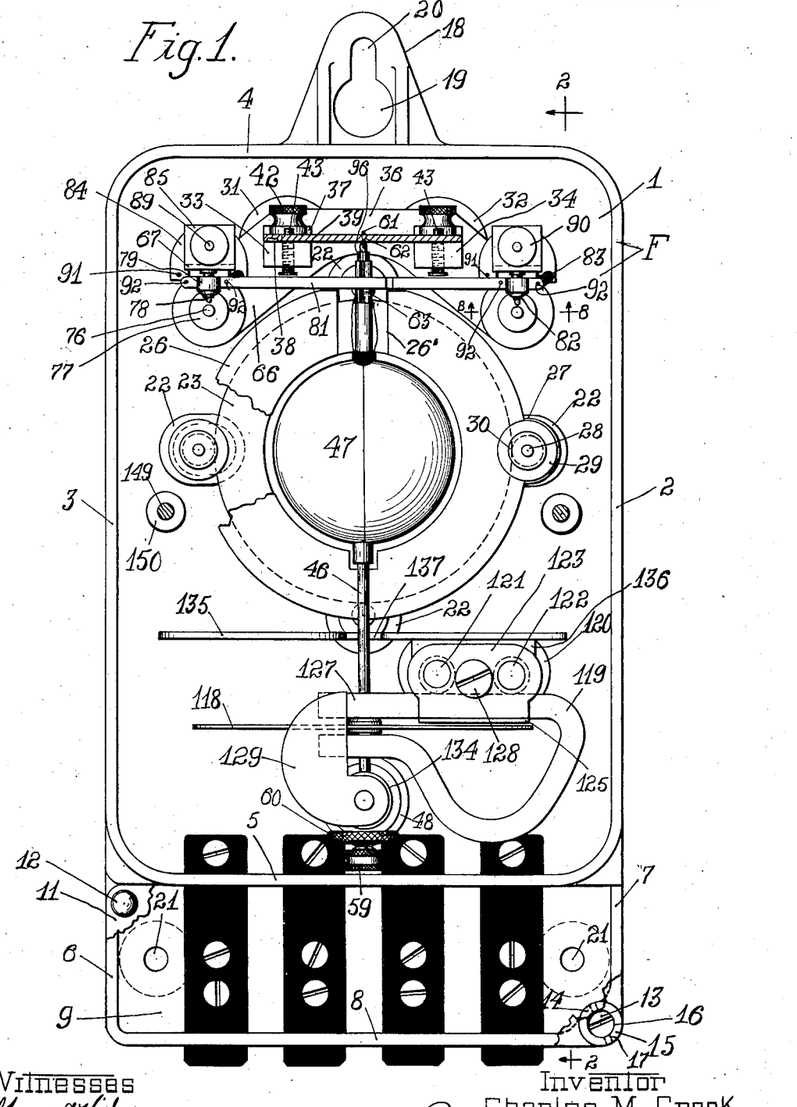
Figure 1 is a front view of the meter, the cover parts being removed and the integrating mechanism being cut away.
Figure 5:
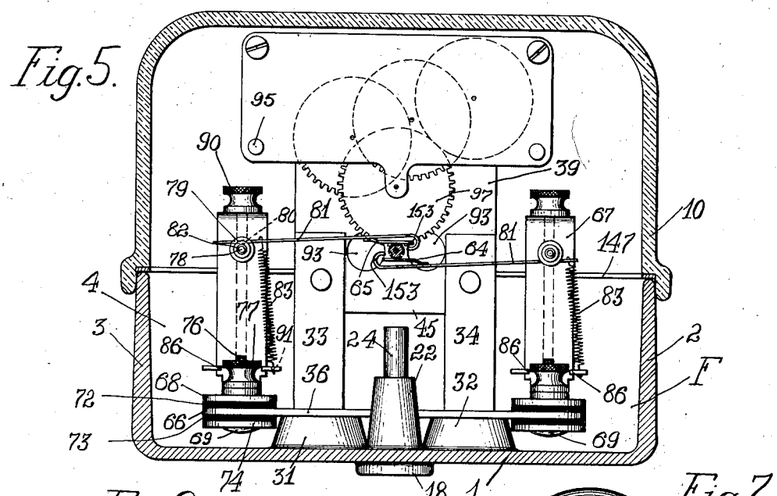
Fig. 5 is a sectional view taken on plane 5—5 of Fig. 2.

The ends 66 of the brush mechanism supporting frame 36 extend downwardly, as shown in Fig. 1, each end supporting a brush regulator frame 67. The base or foot 68 of each frame 67 is secured to the corresponding end 66 of the frame 36 by means of a pin or rivet 69. The frames 67 should be insulated from each other, and therefore from the frame 36. A bushing 70 of insulating material therefore lines the elongated opening 71 through each end 66 and insulating washers 72 and 73 are applied at opposite sides of the end 66, a metallic rivet washer 74 being at the outside of the insulating washer 73. The flat rivet pin 69 extends through corresponding openings in the foot 68, insulating washer 72, 73, and the rivet washer 74, and also through the insulating bushing 70, the shoulder 75 on the pin engaging against the foot 68 of the brush frame 67. The end of the pin is then riveted over against the rivet washer 74, and the various members are securely and rigidly held together by this rivet pin, the insulating bushing and washers serving to insulate the brush frames upon the main frame 36. A threaded extension 76 from the rivet pin accommodates a binding nut 77, between which nut and the body of the rivet pin, terminal wires may be clamped for connecting the brush frames 67 in circuit. Extending downwardly from the front end of the horizontal part of each brush frame 67 is a pivot pin 78 which may be riveted securely to the brush frame. On each pin is pivoted a hub or collar 79 having a slot 80 in which is wedged the end of a flat spring 81 which carries at its ends one of brush contacts 64, 65. Each hub is held to its pivot in some suitable manner, as by wire washer 82 bent about the pin end. As a means for holding the brush contacts against the commutator spiral springs 83 connect between the brush springs and slide plates 84. Each plate is parallel to the upturned end 85 of the brush frame 67 and has hooked ends 86 for engaging about the edges of the brush frame. Each slide plate carries a threaded lug 87 which receives the threaded end of the micrometer adjusting screw 88. The reduced end 89 of this screw passes through the upturned part 85 and has secured thereto the knurled head 90. Turning of this knurled head causes rotation of the screw and sliding of the plate 84 longitudinally along the horizontal part of the brush frame to put more or less tension on the corresponding brush adjusting spring 83. Each hooked end of the slide plate has a hole 91 and each brush spring has two holes 92, one on each side of the pivot hub. The spring 83 for each brush may therefore be connected with the brush spring at the inside or the outside of the pivot hub, depending upon which side of the commutator is to be engaged by the brush contact. The arrangement of these holes also makes the slide plates and the brush springs all alike so that only one form need be manufactured which can be used on either side of the commutator. The arrangement of the brushes and brush adjusting mechanism is, perhaps, best shown in Fig. 5. Referring to said figure, the left hand brush engages the rear of the commutator and therefore the corresponding brush spring connects between the inner holes of the slide plate and brush spring. The right hand brush engages against the front side of the commutator and the commutator spring is at the outside of the brush spring pivot and connecting between the outer holes of the brush spring and slide plate. Each spring and its adjusting micrometer screw are parallel, and therefore temperature effects are counteracted and the proper adjustment of the brushes maintained. For example, suppose that the springs are heated and owing to their temperature coefficient become longer. This means that the tension on the brushes is lessened, which might disturb the adjustment. The micrometer screws, however, being parallel with the springs also stretch due to the change in temperature, which results in further distention of the springs to offset the increase in length of the springs due to the change in temperature and therefore the brush contact engagement with the communtator is maintained constant. As will appear in the copending application of George M. Willis already referred to, the engagement of the brush contacts with the commutator serves as a means for adjusting for accuracy of the meter under different loads. The construction which I have just described which maintains constant contact conditions between brushes and commutator therefore forms a very important feature of my invention. The micrometer adjusting arrangement will always maintain its adjustment independently of jars or other disturbances and the brushes, when once adjusted, will maintain such adjustment. The top plate 39 has two sight openings 93 through which the brushes can be readily inspected.

The plate 39 at its front end forms the top wall for the integrating mechanism housing, the lower wall 94 of which is suspended from the plate 39 by posts 95. The various transmission shafts for transmitting movement from the armature spindle to the order wheels are all vertical and pivot in the top plate 39 and lower plate 94. As has been before shown, the upper end of the armature spindle also pivots in the plate 39. The armature spindle and the various integrating mechanism shafts all pivoting in this common integral plate 39, there is no chance for relative displacement of the shafts and the true gearing relations will always be maintained between the gears mounted on said shafts. This is a very important improvement over the arrangement in prior meters in which separate bearing or pivot members were provided for the armature spindle and the integrating mechanism shafts, the least relative displacement of which separate pivot members would result in disturbance of the gearing relations and consequently in disturbance in the efficiency of indication.

At the top of the armature spindle I provide a pinion 96 which meshes with the gear 97 mounted on one of the vertical shafts of the integrating mechanism. Rotation of this gear is transmitted through a number of other gears and shafts to an elongated pinion 98 which meshes with a gear wheel 99, secured to the shaft 100 which is vertically reciprocable and which carries a worm 101.

Formed integral with the worm 101 is a cylindrical cam 102 which coöperates with the cam roller 103 to cause the vertical reciprocation of a shaft 100 upon rotation of said shaft. The worm meshes with the pinion 104 secured to the units member of the order wheels 105. The pitches of the worm cams are such that the pinion will not be rotated during the combined rotation of the worm and forward movement of the shaft. However, when the cam offset is reached and the shaft released from the cam roller, the shaft drops without rotating and therefore the worm during this downward movement of the shaft causes rotation of the pinion and movement through one division of the units wheel. To insure the return of shaft 100 upon release of the cam 102 from the roller 103, I provide a top cam roller 106 which coöperates with a cylindrical cam 107 formed integral with the worm 101 at the upper end thereof. The shaft 100 during operation of the meter continuously rotates and if for any reason this shaft should not fall immediately after the lower cam offset reaches the lower cam roller, the upper cam will be engaged by the upper cam roller and the shaft given a downward impulse, whereupon it quickly drops to its lowermost position, the worm wheel during descent of the shaft causing rotation of the units order wheel.

Figure 3:
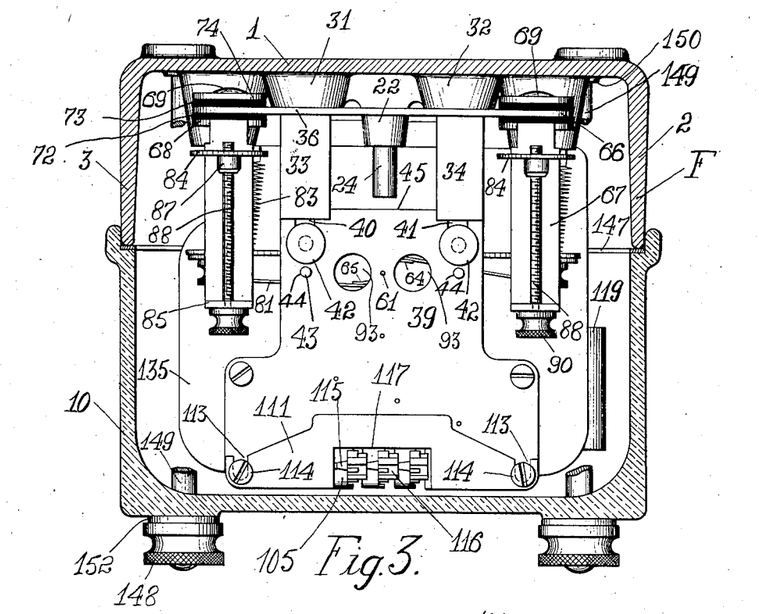
Fig. 3 is a top view of the meter with the cover removed.
Figure 4:
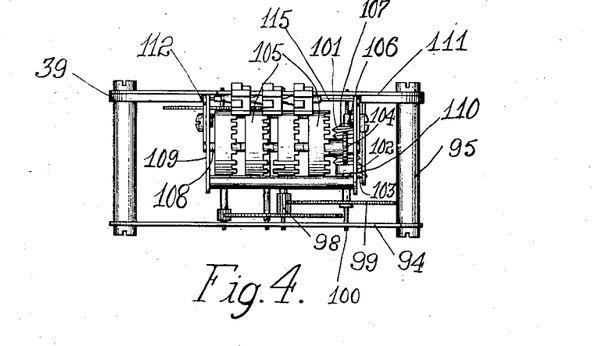
Fig. 4 is a front view of the integrating mechanism.

In my construction the integrating members with their driving pinion and carryover mechanism can be bodily removed very readily from the driving mechanism and when thus removed can be readily and quickly restored to any desired indication. The units member carrying the pinion 104 and the other order members are mounted on the shaft 108 which is pivoted in the side walls 109, 110. These side walls are secured to depend from a top plate 111. The top plate 39 has the opening 112 cut out of its front edge, through which opening the side walls pass when the integrating mechanism is to be applied, the ends of the top plate 111 engaging on the top plate 39 adjacent the opening 112, as best shown in Fig. 3. In the rear edges of this top plate at the ends thereof are cut the notches 113 which receive screws 114 which thread into end posts 95. When these screws are loosened the top plate can be slid forwardly and disconnected from the main plate 39, and when this top plate is again applied it will be securely clamped to the main plate 39 by the heads of the screws 114. Between the side walls 109, 110 and at the top thereof the countershaft 115 is pivoted which supports the carry-over members 116, a slot 117 being cut in the front edge of the top plate 111 for receiving these carry over members. When the plate 111 is removed the integrating members and their carry-over members are bodily removable from the driving mechanism and resetting of the members can be quickly and easily accomplished. This removal of the integrating members in no way disturbs the driving mechanism.

At the lower end of the armature spindle is mounted the retarding disk 118 which disk is spanned by a retarding magnet 119. Cast integral with the base 1 is a lug 120 from which two posts 121 and 122 extend outward, the posts being driven into said lug and thus being very rigid and permanent. At the upper end these posts are joined by a clamping plate 123 which is secured to the post ends. Slidably engaging the posts below the fixed top clamping plate is the clamping plate 124. Between these clamping plates is the horizontal base 127 of the damping magnet, the plates being held in clamping engagement with the magnet by means of the clamping screw 128 passing through the end plate and threading in the sliding plate. The magnet is locked against lateral displacement by the flanges 125, 126, or the plates 123 and 124 respectively, and by the posts 121, 122, against which the magnet engages. The magnet is clamped between the plates so that its pole ends span the retarding disk and by loosening the clamping screw the magnet can be slid tangentially with respect to the retarding disk to thereby adjust the retarding effect. The magnet can also be very readily removed entirely and when applied between the clamping plates will always assume its correct position with reference to the disk. As a further means for adjusting the damping effect of the magnet there is a shunting member or wing 129 arranged to be adjusted to shunt more or less of the magnetism around the magnet poles. The arrangement of this adjusting wing is best shown in Fig. 6. A threaded extension 130 screws into the front end of the bearing post 49, this extension being engaged by a split sleeve 131 to the upper end of which the adjusting wing is riveted. The lower edge 132 of the split sleeve is tapered and is engaged by the tapered collar 133 extending from the locking nut 134. To adjust, the nut 134 is loosened and sleeve 131 can then be rotated to bring the adjusting wing into position to cover more or less of the pole ends and to adjust the distance between the adjusting wing and the pole ends. When the desired adjustment is reached, the nut 134 is tightened and the ends of the split sleeve clamped to the extension 130. The retarding adjustment for controlling the speed of the meter can therefore be made very quickly and easily, and with great accuracy. To prevent disturbance of the magnetism of the retarding magnet by the field of the field coil, a magnetic shield 135 is interposed between the field coil and retarding magnet. This magnetic shield is in the form of an iron plate arranged horizontally and having the vertical foot 136 which engages the lug 120 and which has openings through which the posts 121, 122, pass, the foot being securely clamped to the lug by shoulders on these posts. The shield also has the slot 137 extending rearwardly from its end for receiving the armature spindle.

Figures 7, 8, 9:
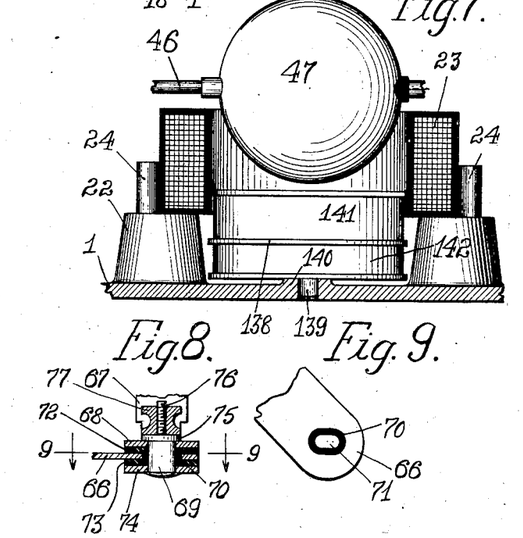
Fig. 7 is a view from the left of Fig. 2 showing the arrangement and design of the adjusting coil and the resistance coil, the field coil being shown in section.
Fig. 8 is a sectional view taken on plane 8—8 of Fig. 1, showing the method of supporting and insulating the brush adjustment frames.
Fig. 9 is a top view taken on plane 9—9 of Fig. 8.

In Fig. 2, and particularly Fig. 7 is shown the manner in which an auxiliary coil and a resistance coil are supported. A double spool 138 has an extension 139 which is driven into the lug 140, forming part of the meter base plate and this spool at its front part supports the auxiliary coil 141 and at its rear part the resistance coil 142. The auxiliary coil extends into the core of the field coil and adjacent the armature so that current flow through said auxiliary coil will generate an auxiliary field for the armature. In practice, the auxiliary coil, the resistance winding, commutator brush and segments, and the armature winding are included serially in a circuit connected in bridge of the main circuit to be measured.

In Figs. 1 and 2 are shown the terminal connecting sleeves which are four in number and which extend through openings in the walls 8 and 5 of the meter frame and through the compartment 9. Each sleeve is formed as shown best in Fig. 1, the bore 143 receiving an external wire which is clamped in said bore by clamping screws 144, the inner bore 145 of the sleeve receiving a wire from the meter circuit which is clamped in said bore by a screw 146. After the meter has been properly installed, the lid 11 is closed and the locking screw 13 applied and the sealing wire or pin inserted through the sealing openings. In order to tamper with the meter connections it therefore becomes necessary to break the seal. The sealing lid also incloses the screws which pass through openings 21, and it is therefore impossible for the customer or other parties to change the position of the meter on the wall, which might result in its being thrown into a position in which it would not operate properly.

The glass cover 10 for closing the main part of the frame engages the edge of the frame, suitable sealing material 147 being inserted between the cover and the frame, the cover being held in place by thumb nuts 148 engaging the ends of posts 149 which are driven and riveted in lugs 150, and which extend forwardly through the openings 151 in the glass cover, rubber or leather washers 152 intervening between the nuts and the cover.

With the construction and arrangement as described the active parts are open to inspection and can very readily and quickly be removed for closer inspection or for repairs. By removing the top screws 42, the plate 39 with the integrating mechanism can be removed, thus releasing the upper end of the armature spindle. The retarding magnet being slid away from the retarding disk, the armature spindle can be lifted from the lower bearing and removed from the meter, the spindle passing through the slot 137 in the magnetic shield. By then withdrawing the thumb nuts 30, the plate 26 can be withdrawn from the field coil to allow the field coil to be removed. The brush spring with the brush contacts can readily be removed by withdrawing the wire washers 82 from the pivot pins 78. When the parts are again to be assembled, they will assume their correct positions owing to the various means employed for centering and for guiding the parts into such proper position. By virtue of these guiding and centering means only very simple means are necessary for holding the parts in place. For example, only two screws 42 are necessary for holding the main plate 39 in its proper position, and only two thumb nuts 29 are necessary to lock the field coil in place. The driving engagement of the various supporting posts and members with the lugs cast integral with the base plate of the meter causes solidity, rigidity, and strength, which is not found in other meters, and as a consequence a meter involving my improved features of construction and arrangement can be shipped from the factory after being set up and adjusted with assurance that it will reach its destination with all the parts in perfect order, alinement and adjustment. The parts are very few in number and of the simplest construction and arrangement. There are no delicate parts, the mere touch of which might result in unbalancing the meter and throwing it out of adjustment. As a means for protecting the brush contacts 64, 65 which are delicate strips of preferably platinum, the ends 153 of the brush springs 91 are bent about the ends of the contacts as shown.

Having thus described my invention, I desire to secure the following claims by Letters Patent:

1. In an electricity meter, the combination of an armature, torque producing means for said armature, a retarding disk adapted to rotate upon rotation of the armature, a retarding magnet spanning said disk, supporting posts adjacent the disk and parallel thereto, a stationary clamping member on said posts, a movable clamping member on said posts, and a clamping screw engaging said clamping members, said magnet being secured between said clamping members.

2. In an electricity meter, the combination of an armature, torque producing means for the armature, a retarding disk for the armature, a retarding magnet spanning said disk, a supporting frame, two posts extending outwardly from said supporting frame, a clamping plate secured to the end of said posts, a movable clamping plate slidable on said posts, and a clamping screw engaging the clamping members between said posts, said magnet being clamped between said clamping plates.

3. In an electricity meter, the combination of a supporting frame, an armature pivoted on said frame, torque producing means for the armature, a speed regulating disk for the armature, a damping magnet for said disk, posts extending from said frame and rigidly secured thereto by being driven into openings in said frame, a stationary clamping member on said posts, a slidable clamping member on said posts, and means for causing said clamping members to clamp the damping magnet to hold it in rigid position with reference to the disk.

4. In an electricity meter, the combination of a supporting frame, an armature pivoted on said frame, torque producing means for said armature, a speed regulating disk for the armature, a damping magnet having a part parallel with said disk, supporting posts extending from said frame, a clamping member secured to said posts, a second clamping member slidable on said posts, and means for drawing said members together to clamp the parallel part of said damping magnet, sliding of said damping magnet between the clamping members upon loosening of said members causing adjustment of said magnet with respect to the disk.

5. In an electricity meter, the combination of a supporting frame, an armature pivoted on said frame, a field coil for the armature, a speed regulating disk for the armature, a retarding magnet for said disk, supporting posts for said magnet extending from said frame, and a magnetic shield between the magnet and said field coil, said shield being secured to the frame by the engagement of the posts with said frame.

6. In an electricity meter, the combination of a supporting frame, an armature pivoted on said frame, field producing means for said armature, a speed regulating disk for said armature, a retarding magnet associated with said disk, posts for supporting said magnet, said frame having openings and said posts having reduced ends for engaging with driving fit in said openings, and a magnetic shield interposed between the field producing means and said magnet, said shield being secured to the frame by being clamped between said frame and the shoulders of said posts.

7. In an electricity meter, the combination of a supporting frame, an armature pivoted on said frame, field producing means for the armature, a speed regulating member for the armature, a retarding magnet associated with said member, supporting posts for the magnet extending from said frame and having shoulders, and a magnetic shield interposed between the field producing means and said magnet, said shield being supported from the frame by being clamped between said frame and the shoulders on said posts.

8. In an electricity meter, the combination of a supporting frame, an armature pivoted on said frame, a field coil for said armature, lugs extending from said frame and forming a seat for said field coil, and posts extending from said lugs for locating said field coil in position on said seats.

9. In an electricity meter, the combination of a supporting frame, an armature pivoted to said frame, a field coil for said armature, lugs extending from said frame and forming seats for said field coil, posts extending from said lugs and engaging the field coil to prevent displacement thereof, and a plate secured to said posts and engaging the field coil to lock said field coil against said seats.

10. In an electricity meter, the combination of a supporting frame, an armature pivoted on said frame, a circular field coil spanning the armature, lugs extending from said frame and forming a seat for the field coil, posts extending from said lugs for preventing displacement of the coil, and an annular plate surrounding the armature and clamped to said posts, said plate engaging the field coil to lock said field coil to said seat.

11. In an electricity meter, the combination of a main frame, an armature, a commutator, integrating mechanism for recording the movements of the armature, supporting arms for said integrating mechanism extending from the main frame, brushes for the commutator, and a brush supporting frame held in position by being clamped between the main frame and said supporting arms.

12. In an electricity meter, the combination of a main frame, an armature, a commutator for the armature, integrating mechanism for recording the movements of the armature, supporting arms for the integrating mechanism secured to and extending from the main frame and having shoulders, brushes for the commutator, and a brush supporting frame clamped between the main frame and said shoulders.

13. In an electricity meter, the combination of a main frame, an armature, an armature shaft, a bearing for said armature shaft, a supporting arm for said bearing extending from the main frame and secured thereto and having a shoulder, a commutator for the armature, a brush engaging said commutator, and a brush supporting frame for said brush clamped to the main frame by the shoulder on said arm.

14. In an electricity meter, the combination of a main frame, an armature, an armature shaft, a bearing for said armature shaft, supporting arms for said bearing extending from the main frame and each having a shoulder, a commutator for the armature, brushes engaging the commutator, and a brush supporting frame clamped to the main frame by the shoulders on said arms.

15. In an electricity meter, the combination of a base, an armature shaft, a member extending from the base, an element secured to such member to constitute a bearing for such shaft, and pins extending from said member and engaging in openings in said bearing element and adapted for preventing lateral removal of said bearing element from such member when the shaft is in the bearing.

16. In an electricity meter, the combination of a base, an armature shaft, a member extending from the base, a plate secured to such member to constitute a bearing for such shaft, and devices extending from said member and engaging said plate and adapted for positioning the bearing and shaft so that the plate must first be removed longitudinally from the shaft before such plate can be removed from such member.

17. In an electricity meter, the combination of a base, an armature shaft, a member extending from the base, an element secured to such member to constitute a bearing for such shaft, and devices for preventing the lateral removal of the bearing element from such member when the shaft is in the bearing, such element also constituting the support for the integrating mechanism of the meter.

18. In an electricity meter, the combination of a base, an armature shaft, a member extending from the base, an element removably secured to such member to constitute a bearing for such shaft, and devices extending from said member and engaging said element and adapted for positioning the bearing and shaft so that the bearing element must first be removed longitudinally from the shaft before such element can be removed from such member, such element also constituting the support for the integrating mechanism of the meter and removable to reset the registering devices.

In witness whereof, I hereunto subscribe my name, this 17 day of November, A. D. 1908.

CHARLES M. CROOK.

Witnesses:
 CHARLES J. SCHMIDT,
 FRANK J. THELEN.